(12) United States Patent
Cady

(10) Patent No.: US 12,204,791 B2
(45) Date of Patent: *Jan. 21, 2025

(54) AUTOMATICALLY TUNING A QUALITY OF SERVICE SETTING FOR A DISTRIBUTED STORAGE SYSTEM WITH A DEEP REINFORCEMENT LEARNING AGENT

(71) Applicant: NetApp, Inc., San Jose, CA (US)

(72) Inventor: Tyler W. Cady, Denver, CO (US)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,199

(22) Filed: Aug. 2, 2023

(65) Prior Publication Data

US 2024/0004576 A1 Jan. 4, 2024

Related U.S. Application Data

(63) Continuation of application No. 17/841,903, filed on Jun. 16, 2022, now Pat. No. 11,842,068, which is a
(Continued)

(51) Int. Cl.
*G06F 3/06* (2006.01)
*G06F 16/182* (2019.01)
*G06N 3/08* (2023.01)

(52) U.S. Cl.
CPC .......... *G06F 3/0655* (2013.01); *G06F 3/0604* (2013.01); *G06F 3/067* (2013.01); *G06F 16/182* (2019.01); *G06N 3/08* (2013.01)

(58) Field of Classification Search
CPC ............... G06F 11/3006; G06F 11/301; G06F 11/3065; G06F 11/3409; G06F 11/3438; G06F 11/3442; G06F 2009/4557; G06F 2009/45591; G06F 9/45558; G06F 9/5027; G06F 9/5077

See application file for complete search history.

(56) References Cited

U.S. PATENT DOCUMENTS

| 9,838,269 | B2 | 12/2017 | Wright et al. |
| 11,392,315 | B1 | 7/2022 | Cady |
| 2018/0081832 | A1 | 3/2018 | Longo et al. |

OTHER PUBLICATIONS

Corrected Notice of Allowance mailed on Aug. 30, 2023 for U.S. Appl. No. 17/841,903, filed Jun. 16, 2022, 3 pages.
(Continued)

*Primary Examiner* — Yong J Choe
(74) *Attorney, Agent, or Firm* — Jaffery Watson Hamilton & DeSanctis LLP

(57) ABSTRACT

Systems and methods are described for using a Deep Reinforcement Learning (DRL) agent to automatically tune Quality of Service (QoS) settings of a distributed storage system (DSS). According to one embodiment, a DRL agent is trained in a simulated environment to select QoS settings (e.g., a value of one or more of a minimum IOPS parameter, a maximum IOPS parameter, and a burst IOPS parameter). The training may involve placing the DRL agent into every feasible state representing combinations of QoS settings, workload conditions, and system metrics for a period of time for multiple iterations, and rewarding the DRL agent for selecting QoS settings that minimize an objective function based on a selected measure of system load. The trained DRL agent may then be deployed to one or more DSSs to constantly update QoS settings so as to minimize the selected measure of system load.

20 Claims, 8 Drawing Sheets

Related U.S. Application Data continuation of application No. 17/237,505, filed on Apr. 22, 2021, now Pat. No. 11,392,315.

(56) References Cited

OTHER PUBLICATIONS

Non-Final Office Action mailed on May 11, 2023 for U.S. Appl. No. 17/841,903, filed Jun. 16, 2022, 8 pages.
Notice of Allowance mailed on Aug. 4, 2023 for U.S. Appl. No. 17/841,903, filed Jun. 16, 2022, 11 pages.
Simonini, T., & Sanseviero, O., "An Introduction to Deep Reinforcement Learning," Chapter 1 of the Deep Reinforcement Learning Class with Hugging Face, 30 pages.
WIKIPEDIA., "Deep Reinforcement Learning," 8 Pages.

AUTOMATICALLY TUNING A QUALITY OF SERVICE SETTING FOR A DISTRIBUTED STORAGE SYSTEM WITH A DEEP REINFORCEMENT LEARNING AGENT

RELATED APPLICATIONS

This application is a continuation of U.S. patent application Ser. No. 17/841,903, filed Jun. 16, 2022, now U.S. Pat. No. 11,842,068, which is a continuation of U.S. patent application Ser. No. 17/237,505, filed Apr. 22, 2021, now U.S. Pat. No. 11,392,315, both of which are hereby incorporated by reference in their entirety for all purposes.

BACKGROUND

Field

Various embodiments of the present disclosure generally relate to data storage systems. In particular, some embodiments relate to the training and use of a Deep Reinforcement Learning (DRL) agent for automatic tuning of Quality of Service (QoS) settings of volumes in a distributed storage system.

Description of the Related Art

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives, solid state drives, flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume. For example, the metadata may describe, e.g., identify, storage locations on the devices for the data. The data of each volume may be divided into data blocks. The data blocks may be distributed in a content driven manner throughout the nodes of the cluster.

One way of attempting to provide a better user experience is by providing a Quality of Service feature that allows users to set a QoS that guarantees a particular level of performance for volumes. For example, QoS may guarantee a particular level of performance by provisioning minimum, maximum, and/or burst levels of input/output operations per second (IOPS) to volumes.

SUMMARY

Systems and methods are described for using a Deep Reinforcement Learning (DRL) agent to automatically tune Quality of Service (QoS) settings for a distributed storage system (DSS). According to one embodiment, based on a current state of the DSS, a deep reinforcement learning (DRL) agent of the DSS makes a determination regarding whether to update a Quality of Service (QoS) setting of the DSS representing a level of performance being provided by the DSS to a client. The current state may include (i) the QoS setting, (ii) information indicative of a type of workload to which the DSS is exposed, and (iii) a system metric indicative of a load on the DSS. When the determination is affirmative, an updated QoS setting is determined and applied to the DSS.

According to another embodiment, a DRL agent running within a distributed storage system (DSS) is iteratively trained for each state of multiple of states of the DSS. For each state of a multiple states of the DSS, the DRL agent is caused to determine whether to update a set of QoS parameters representing a level of performance being provided by the DSS to a client, during a current iteration of the training based on the state. The state may include (i) the set of QoS parameters, (ii) information indicative of a type of workload to which the DSS is exposed, and (iii) a system metric indicative of a load on the DSS. Responsive to an affirmative determination by the DRL agent, an updated set of QoS parameters is determined, the updated set of QoS parameters is applied to the DSS, and when application of the updated set of QoS parameters lessens the system metric, the DRL agent is rewarded.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
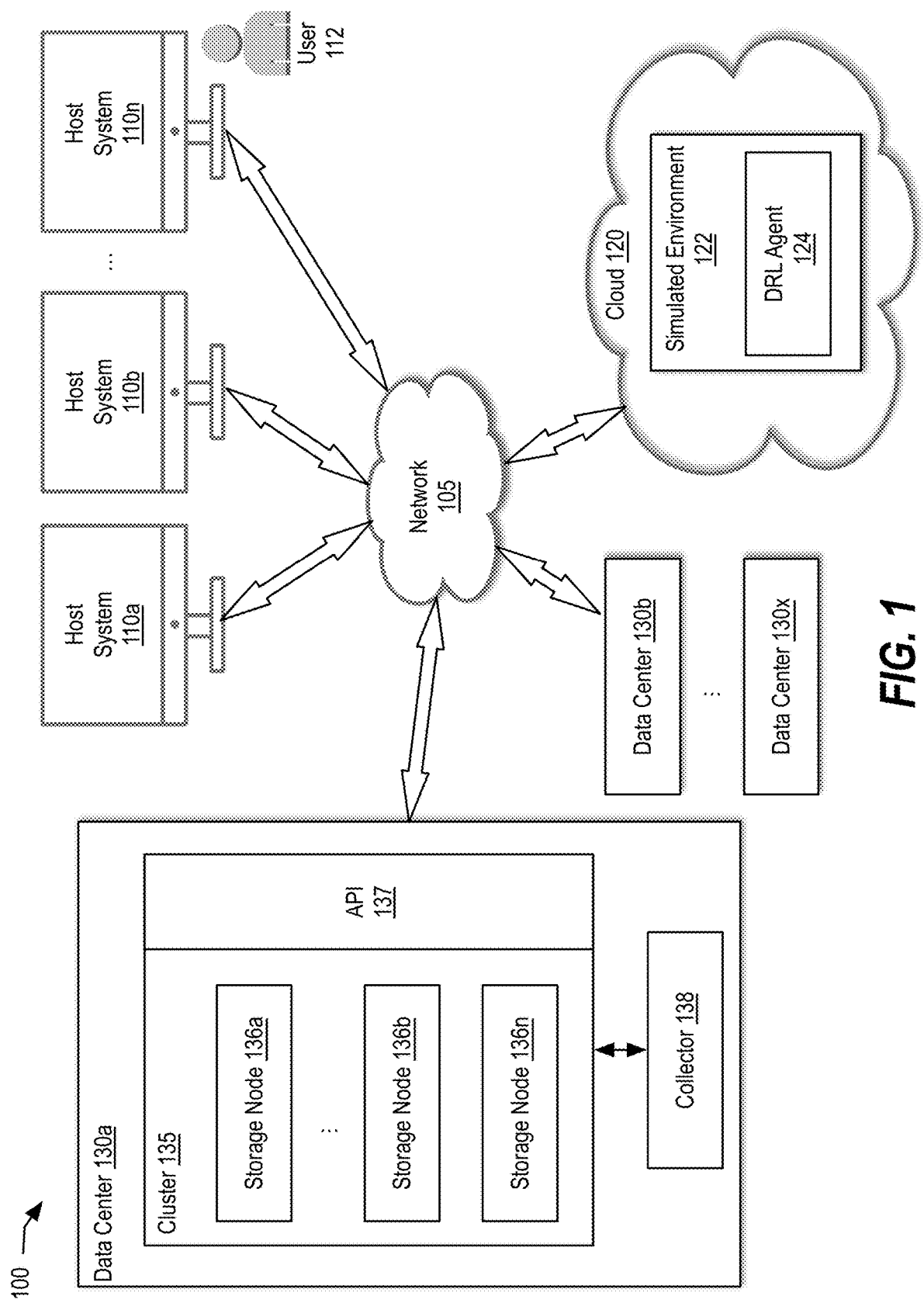
FIG. 1 is a block diagram illustrating an environment in which various embodiments may be implemented.

Systems and methods are described for using a DRL agent to automatically tune QoS settings of a distributed storage system. One way of attempting to provide a better user experience for users of distributed storage systems is by providing a QoS feature that allows users to set a QoS that guarantees a particular level of performance for volumes of the distributed storage system. For example, QoS may guarantee a particular level of performance by provisioning minimum, maximum, and/or burst levels of input/output operations per second (IOPS) to the volumes.

While proper settings for various QoS parameters enhance overall performance of a distributed storage system, provisioning of QoS parameters (e.g., minimum, maximum, and burst levels of IOPS) to volumes is highly dynamic and complex, thereby resulting in misconfiguration by users. Over or under provisioning of QoS settings may lead to suboptimal utilization of the QoS feature and degrade volume and overall system performance.

Embodiments described herein seek to improve the technological process of identifying appropriate QoS settings for a distributed storage system. Various embodiments of the present technology provide for a wide range of technical effects, advantages, and/or improvements to computing systems and components. For example, various embodiments may include technical effects, advantages, and/or improvements relating to one or more of (i) training of a DRL agent for the particular practical application of tunning QoS settings of a distributed storage system; (ii) use of the trained DRL agent in a production environment to automatically tune a QoS setting of a volume of a distributed storage system; and (iii) use of non-routine and unconventional computer operations to enhance the training and/or use of the DRL agent in the context of a distributed storage system.

According to one embodiment, a DRL agent may be trained in a simulated environment replicating cluster performance and a target production environment with respect to latency and QoS. The trained DRL agent may then be deployed to one or more clusters to constantly update QoS settings in an optimal manner so as to minimize a selected measure of load on the cluster. In this manner, the DRL agent is expected to learn and adapt to new trends in volume utilization and make adjustments to QoS settings on the fly accordingly.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

A "client" may be used herein to refer to a physical or virtual machine or a process running thereon. A client process may be responsible for storing, retrieving, and deleting data in the system. A client process may address pieces of data depending on the nature of the storage system and the format of the data stored. For example, the client process may reference data using a client address. The client address may take different forms. For example, in a storage system that uses file storage, the client may reference a particular volume or partition, and a file name. With object storage, the client address may be a unique object name. For block storage, the client address may be a volume or partition, and a block address. Clients may communicate with metadata, corresponding to the slice services and the volume(s) residing on the slice services, using different protocols, such as SCSI, iSCSI, FC, common Internet file system (CIFS), network file system (NFS), HTTP, web-based distributed authoring and versioning (WebDAV), or a custom protocol. Each client may be associated with a volume. In some examples, only one client accesses data in a volume. In some examples, multiple clients may access data in a single volume.

As used herein, "telemetry data" generally refers to performance, configuration, load, and other system data of a monitored system. Telemetry data may refer to one data point or a range of data points. Non-limiting examples of telemetry data for a distributed storage system include latency, utilization, a number of input output operations per second (IOPS), a slice service (SS) load, Quality of Service (QoS) settings, or any other performance related information.

As used herein, "slice service load" or "SS load" generally refer to a measure of volume load per storage node of a distributed storage system. As described further below, IO operations may be throttled by the storage operating system of the distributed storage system depending upon and responsive to observation of the SS load exceeding various predefined or configurable thresholds. In one embodiment, SS load is a measure of cache (e.g., primary cache and secondary cache) capacity utilization in bytes (e.g., percent full of 8 gigabytes (GB) in the primary cache and a relatively large number of GB in the secondary cache). Depending upon the particular implementation, the SS load may be the maximum between the fullness of the primary cache and the secondary cache (e.g., a maximum among all services hosting a given volume). According to one embodiment, these two metrics, along with perceived latency, may be the inputs into the SS load calculation (which may be desired to be minimized to a point). For example, SS load may be the maximum value between primary cache fullness, secondary cache fullness, and latency.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The terms "component", "module", "system," and the like as used herein are intended to refer to a computer-related entity, either software-executing general-purpose processor, hardware, firmware and a combination thereof. For example, a component may be, but is not limited to being, a process running on a processor, an object, an executable, a thread of execution, a program, and/or a computer. By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Example Operating/Learning Environment

FIG. 1 is a block diagram illustrating an environment 100 in which various embodiments may be implemented. In various examples described herein, an administrator (e.g. user 112) of a distributed storage system (e.g., cluster 135) or a managed service provider responsible for multiple distributed storage systems of the same or multiple customers may monitor various telemetry data of the distributed storage system or multiple distributed storage systems via a browser-based interface presented on one of host systems 110a-n.

In the context of the present example, the environment 100 includes multiple data centers 130a-x, a cloud 120, host systems 110a-n, and a user 112. The data centers 130a-x, the cloud 120, and the host systems 110a-n may be coupled in communication via a network 105, which, depending upon the particular implementation, may be a Local Area Network (LAN), a Wide Area Network (WAN), or the Internet.

A given data center (e.g., one of data centers 130a-x) may represent an enterprise data center (e.g., an on-premises customer data center) that is build, owned, and operated by a company or the given data center may be managed by a third party (or a managed service provider) on behalf of the company, which may lease the equipment and infrastructure. Alternatively, the given data center may represent a colocation data center in which a company rents space of a facility owned by others and located off the company premises. Data center 130a is shown including a distributed storage system (e.g., cluster 135) and a collector 138. Those of ordinary skill in the art will appreciate additional IT infrastructure would typically be part of the data center 130a; however, discussion of such additional IT infrastructure is unnecessary to the understanding of the various embodiments described herein.

Turning now to the cluster 135, it includes multiple storage nodes 136a-n and an Application Programming Interface (API) 137. In the context of the present example, the multiple storage nodes 136a-n are organized as a cluster and provide a distributed storage architecture to service storage requests issued by one or more clients (e.g., host systems 110a-n) of the cluster. The data served by the storage nodes 136a-n may be distributed across multiple storage units embodied as persistent storage devices, including but not limited to hard disk drives, solid state drives, flash memory systems, or other storage devices. A non-limiting example of a storage node 136 is described in further detail below with reference to FIG. 3.

The API 137 may provide an interface through which the cluster 135 is configured and/or queried by external actors (e.g., the collector 138, the clients, and a cloud-based, centralized monitoring system (not shown). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration and other system data) relating to the cluster 135 or components thereof. In one embodiment, API calls may be used to obtain information regarding a custom, proprietary, or standardized measure of the overall load (e.g., SS load) or overall performance (e.g., IOPS) of a particular storage node 136 or to obtain information regarding the overall load or performance of multiple storage nodes 136. As those skilled in the art will appreciate various other types of telemetry data, including, but not limited to measures of latency, utilization, load, and/or performance at various levels (e.g., the cluster level, the storage node level, or the storage node component level), may be made available via the API 137 and/or used internally by various monitoring modules.

In various examples described herein, the collector 138 is implemented locally within the same data center in which the cluster 135 resides and periodically polls for telemetry data of the cluster 135 via the API 137. Depending upon the particular implementation, the polling may be performed at a predetermined or configurable interval (e.g., X milliseconds or Z seconds). The collector 138 may locally process and/or aggregate the collected telemetry data over a period of time by data point values and/or by ranges of data point values and provide frequency information regarding the aggregated telemetry data retrieved from the cluster 135 to the centralized monitoring system.

In the context of the present example, the cloud 120, which may represent a private or public cloud accessible (e.g., via a web portal) to an administrator associated with a managed service provider, includes a simulated environment 122 that may be used to train a Deep Reinforcement Learning (DRL) agent 124. The simulated environment 122 may include one or more client systems directing input/output operations to a distributed storage system configured similarly to one to which the trained DRL agent 124 will ultimately be deployed to facilitate automated tuning of QoS settings. An example of how the DRL agent 124 may be trained within the simulated environment 122 is described below with reference to FIG. 6. An example of automated tuning of QoS settings that may be performed by the trained DRL agent after being deployed within another distributed storage system (e.g., cluster 135) operating in a production environment (e.g., data center 130a) is described below with reference to FIG. 7.

While for sake of brevity, only a single cluster is shown in the context of the present example, it is to be appreciated that DRL agents (e.g., DRL agent 124) may be trained and deployed to multiple clusters owned by or leased by the same or different companies. Those skilled in the art will appreciate DRL agents may be trained specifically for states of a cluster expected to operate within a particular target production environment having specific workload characteristics. For example, the DRL agent may be trained for operation within a transactional environment (e.g., latencysensitive transactional workloads, large streaming workloads in which the dominant performance attribute is throughput, transactional workloads involving frequent read/write operations with small I/O size in which the dominant performance attribute is IOPS, small datasets in which data is accessed infrequently and performance is not of primary importance, write-heavy database workloads, workloads that require sustained IOPS performance, workloads that require sub-millisecond latency and sustained IOPS performance, etc.), a compute heavy environment (e.g., infrequent read/write operations with large I/O size), or other typical environments. Alternatively, the DRL agent may be trained for states of a cluster that might operate within a production environment exhibiting a range of workload characteristics in terms of IOPS (e.g., frequent and infrequent IOPS, periods of time having frequent and infrequent read IOPS, periods of time having frequent and infrequent write IOPS, periods of time having high and low proportions of read IOPS to write IOPS, periods of time having small, medium, and large I/O size, etc.).

Systems Metrics and Load of a Distributed Storage System

A distributed storage system (e.g., cluster 135) may include a performance manager or other system metric monitoring and evaluation functionality that can monitor clients' use of the distributed storage system's resources. In addition, the performance manager and/or a QoS system (e.g., a QoS module) may be involved in the regulation of a client's use of the distributed storage system. The client's use of the distributed storage system can be adjusted based upon one or more of system metrics, the client's QoS settings, and the load of the distributed storage system. System metrics may be various measurable attributes of the distributed storage system that may represent directly or be used to calculate a load of the distributed storage system, which, as described in greater detail below, can be used to throttle clients of the distributed storage system.

System metrics are metrics that reflect the use of the system or components of the distributed storage system by all clients. System metrics can include metrics associated with the entire distributed storage system or with components within the distributed storage system. For example, system metrics can be calculated at the system level, cluster level, node level, service level, or drive level. Space utilization is one example of a system metric. The cluster space utilization reflects how much space is available for a particular cluster, while the drive space utilization metric reflects how much space is available for a particular drive. Space utilization metrics can also be determined at the system level, service level, and the node level. Other examples of system metrics include measured or aggregated metrics such as read latency, write latency, IOPS, read IOPS, write IOPS, I/O size, write cache capacity, dedupe-ability, compressibility, total bandwidth, read bandwidth, write bandwidth, read/write ratio, workload type, data content, data type, etc.

IOPS can be real input/output operations per second that are measured for a cluster or drive. Bandwidth may be the amount of data that is being transferred between clients and the volume of data. Read latency can be the time taken for the distributed storage system to read data from a volume and return the data to a client. Write latency can be the time taken for the distributed storage system to write data and return a success indicator to the client. Workload type can indicate if IO access is sequential or random. The data type can identify the type of data being accessed/written, e.g., text, video, images, audio, etc. The write cache capacity refers to a write cache or a node, a block server, or a volume server. The write cache is relatively fast memory that is used to store data before it is written to storage. As noted above, each of these metrics can be independently calculated for the system, a cluster, a node, etc. In addition, these values can also be calculated at a client level.

IOPS may be calculated based on latency and the number of concurrent outstanding read and/or write operations that may be queued (QueueDepth) by the distributed storage system as follows:

$$IOPS = QueueDepth/Latency$$

Bandwidth may be calculated based on QueueDepth, latency and I/O size as follows:

$$Bandwidth = (QueueDepth * IOSize)/Latency$$

where, IOSize is the average I/O size over a period of time (typically, falling between 4 KB to 32 KB, inclusive)

System metrics may be calculated over a period of time (which may be referred to herein as a sample period), e.g., 250 milliseconds (ms), 500 ms, 1 second (s), etc. Accordingly, different values such as a min, max, standard deviation, average, etc., can be calculated for each system metric. One or more of the metrics may directly represent and/or be used to calculate a value that represents a load of the distributed storage system. Loads can be calculated for the distributed storage system as a whole, for individual components, for individual services, and/or individual clients. System load values may then be used by the QoS system to determine whether and how clients are to be throttled.

In some embodiments, performance for individual clients may be adjusted based upon the monitored system metrics. For example, based on a number of factors (e.g., system metrics and client QoS settings), a number of IOPS that can be performed by a particular client over a period of time may be managed. In one implementation, the performance manager and/or the QoS system regulates the number of IOPS that are performed by locking a client out of a volume for different amounts of time to manage how many IOPS can be performed by the client. For example, when the client is heavily restricted, the client may be locked out of accessing a volume for 450 ms of every 500 ms and when the client is not heavily restricted, the client may be blocked out of a volume for 50 ms of every 500 ms. As such, in this example, the lockout effectively manages the number of IOPS that the client may perform every 500 ms. Although examples using IOPS are described, other metrics may also be used, as will be described in more detail below.

Client Quality of Service (QoS) Parameter Settings

In addition to system metrics, client quality of service (QoS) parameters can be used to affect how a client uses the distributed storage system. Unlike metrics, client QoS parameters are not measured values, but rather represent variables than can be set to define the desired QoS bounds for a client. Client QoS parameters can be set by an administrator or a client. In one implementation, client QoS parameters include minimum, maximum, and max burst values. Using IOPS as an example, a minimum IOPS value is a proportional amount of performance of a cluster for a client. Thus, the minimum IOPS is not a guarantee that the volume will always perform at this minimum IOPS value. When a volume is in an overload situation, the minimum IOPS value is the minimum number of IOPS that the distributed storage system attempts to provide the client. However, based upon cluster performance, an individual client's IOPS may be lower or higher than the minimum value during an overload situation.

In one implementation, the distributed storage system can be provisioned such that the sum of the minimum IOPS across all clients can be sustained for all clients at a given time. In this situation, each client should be able to perform at or above its minimum IOPS value. The distributed storage system, however, can also be provisioned such that the sum of the minimum IOPS across all clients cannot be sustained for all clients. In this case, if the distributed storage system becomes overloaded through the use of all clients, the client's realized IOPS can be less than the client's minimum IOPS value. In failure situations, the distributed storage system may also throttle users such that their realized IOPS are less than their minimum IOPS value. A maximum IOPS parameter is the maximum sustained IOPS value over an extended period of time. The burst IOPS parameter is the maximum IOPS value that a client can "burst" above the maximum IOPS parameter for a short period of time based upon credits. In one implementation, credits for a client are accrued when a given client is operating under its respective maximum IOPS parameter. Accordingly, clients may be limited to use of the distributed storage system in accordance with their respective maximum IOPS and burst IOPS parameters. For example, a given client may not be able to use the distributed storage system's full resources, even if they are available, but rather, may be bounded by the respective maximum IOPS and burst IOPS parameters of the given client. In some embodiments, client QoS parameters can be changed at any time by the client, an administrator, and/or by automated means (e.g., by one of the various automated tuning approaches described herein). An example of automated tuning of QoS settings that may be performed by a trained DRL agent is described below with reference to FIG. 7.

Example Deep Reinforcement Learning (DRL) System

Figure 2:
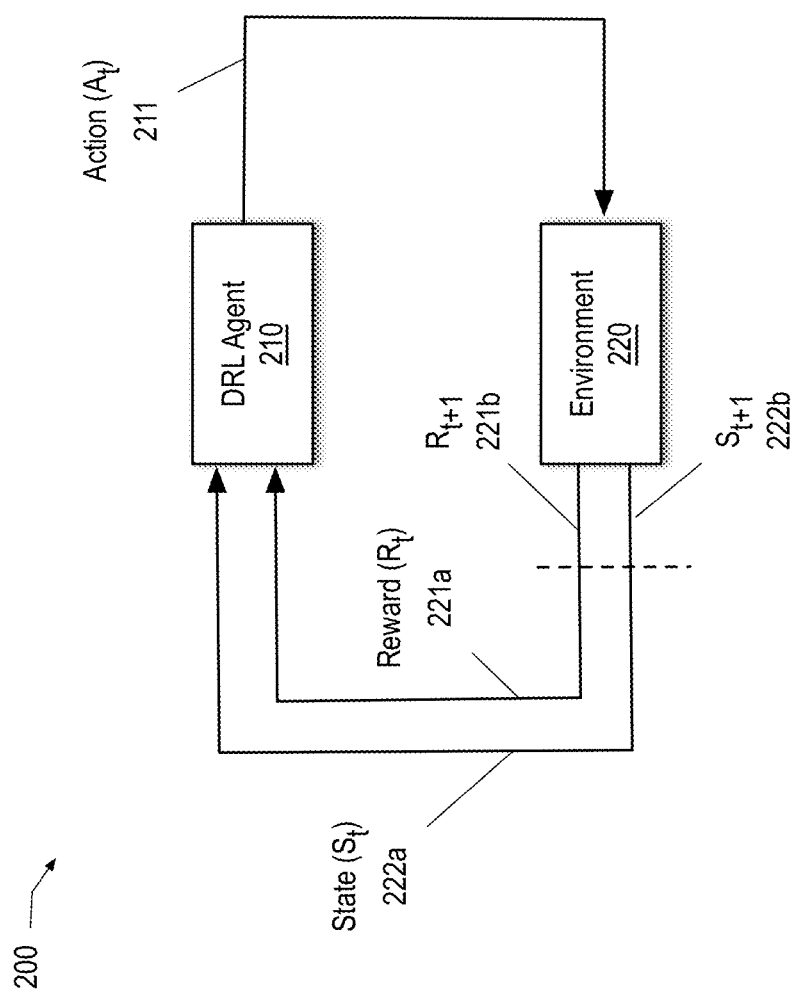
FIG. 2 is a block diagram illustrating a Deep Reinforcement Learning (DRL) system in accordance with an embodiment of the present disclosure.

FIG. 2 is a block diagram illustrating a Deep Reinforcement Learning (DRL) system 200 in accordance with an embodiment of the present disclosure. In the context of the present example, the DRL system 200 includes a DRL agent 210, which may correspond to DRL agent 124, and an environment 220, which may correspond to simulated environment 122 or a production environment depending upon the stage or mode of operation (e.g., learning vs. inference). In general, the DRL agent 210 represents a learner and decision maker and the thing it interacts with, representing everything external to the DRL agent 210, is the environment 220.

The DRL agent 210 and the environment 220 may interact continually with the DRL agent 210 selecting actions (e.g., action ($A_t$) 211) and the environment 220 responding to the actions and presenting new situations to the DRL agent 210. For example, at each discrete time step t, the DRL agent 210 receives a scalar reward ($R_t$) 221a, information indicative of a state ($S_t$) 222a of the environment 220, and selects an action ($A_t$) 211 based on the state ($S_t$) 222. One step later, at discrete time step t+1, based at least in part on the selected action ($A_t$) 211, the DRL agent 210 receives a scalar reward ($R_{t+1}$) 221b and is presented with a new state ($S_{t+1}$) 222b. For its part, the environment 220 receives the action ($A_t$) 211 and responsive thereto, at time step t+1, emits the state ($S_{t+1}$) 22b and emits the scalar reward ($R_{t+1}$) 221b. Non-limiting examples of various functional units of the DRL agent 210 are described below with reference to FIG. 5.

According to various embodiments described herein, the DRL agent 210 may be trained (caused to learn) in a simulated environment (e.g., a distributed storage system running in a controlled environment that exposes the distributed storage system to various workload characteristics). The DRL agent 210 may be iteratively trained by placing the DRL agent 210 into various scenarios (e.g., states of the distributed storage system, represented by a current set of one or more QoS settings, information indicative of a current workload, and current values of a set of one or more system metrics) and causing the DRL agent to select an action (e.g., update the current client QoS settings or maintain the current client QoS settings) to be performed. Over time, the DRL agent 210 learns to select the actions that achieve one or more performance standards (e.g., minimizing one or more system metrics), for example, by applying various policies.

In alternative embodiments, the DRL agent 210 may be trained within the production environment and on the distributed storage system for which it is intended to automatically tune QoS settings, however, such training may cause temporary disruption or otherwise introduced latency to ongoing operations. Additional information regarding non-limiting examples of DRL agents can be found in Sutton Richard S. and Barto, Andrew G. Reinforcement Learning: an introduction. Second ed. The MIT Press, 2020, which is hereby incorporated by reference for all purposes.

Example Storage Node

Figure 3:
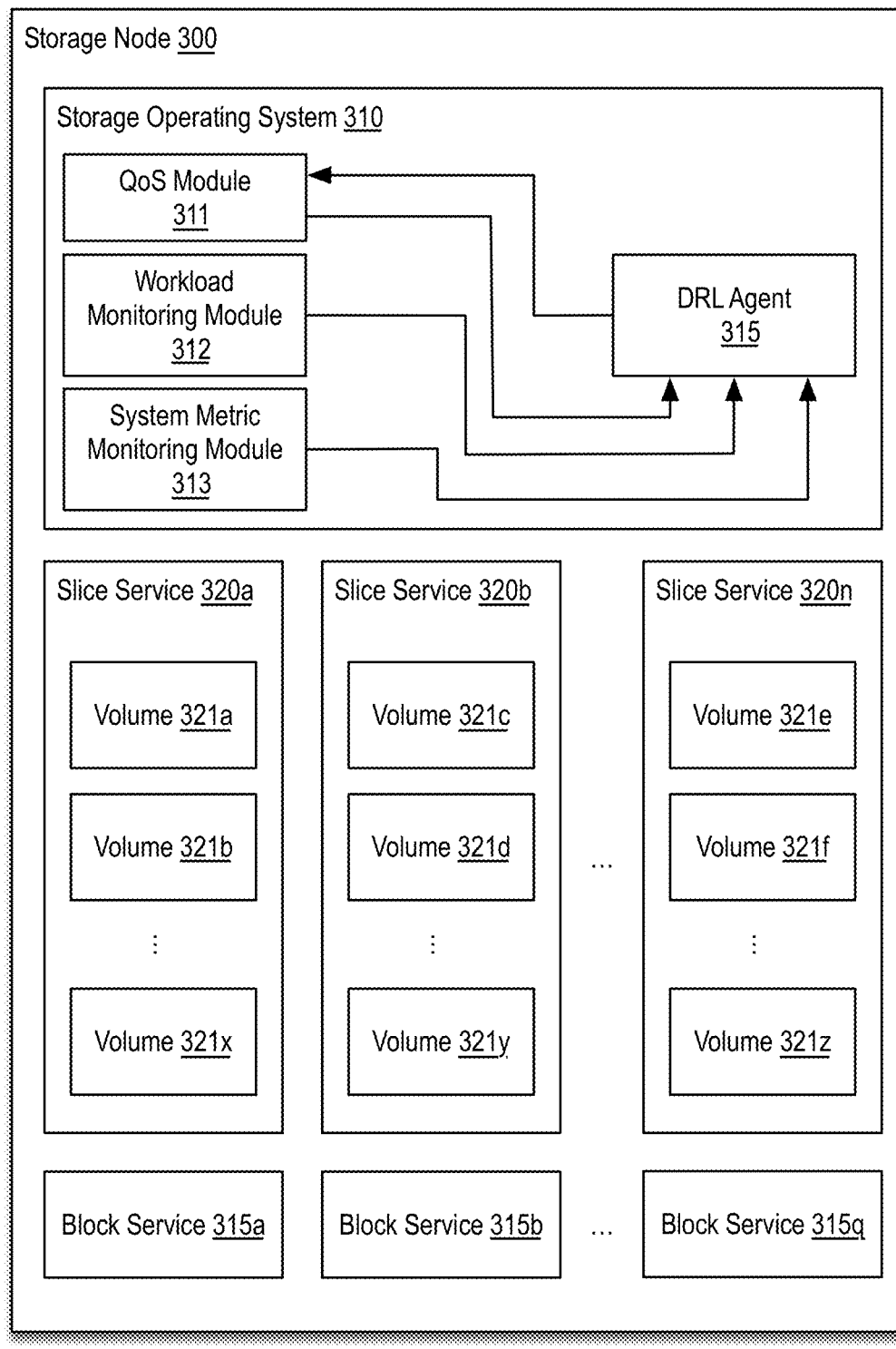
FIG. 3 is a block diagram illustrating a storage node in accordance with an embodiment of the present disclosure.

FIG. 3 is a block diagram illustrating a storage node 300 in accordance with an embodiment of the present disclosure. Storage node 300 represents a non-limiting example of storage nodes 136a-n. In the context of the present example, storage node 300 includes a storage operating system (OS) 310, one or more slice services 320a-n, and one or more block services 315a-q. The storage OS 310 may provide access to data stored by the storage node 300 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 310 is NetApp Element Software (e.g., the SolidFire Element OS) based on Linux and designed for SSDs and scale-out architecture with the ability to expand up to 100 storage nodes.

The storage OS 310 also includes a QoS module 311, a workload monitoring module 312, a system metric monitoring module 313, and a DRL agent 312 (e.g., corresponding to DRL agent 124 and DRL agent 210). Collectively, the QoS module 311, the workload monitoring module 312, and the system metric monitoring module 313 may represent the environment (e.g., environment 220) with which the DRL agent 315 interacts during a learning stage or an operational stage.

The QoS module 311 may be responsible for applying one or more QoS settings (e.g., maximum, minimum, and burst IOPS) to one or more volumes (e.g., volumes 221a-x, volumes 221c-y, and volumes 221e-z) for a particular client (not shown). While various examples described herein may be described with reference to the use of a single QoS setting (e.g., one of a minimum, a maximum, or a burst IOPS parameter), it is to be appreciated the various approaches for automated tuning of QoS settings described herein are equally applicable to various other individual QoS settings and to sets of one or more QoS settings, including, but not limited to a read latency parameter, a write latency parameter, a total IOPS parameter, a read IOPS parameter, a write IOPS parameter, an I/O size parameter, a total bandwidth parameter, a read bandwidth parameter, a write bandwidth parameter, and a read/write IOPS ratio parameter.

The workload monitoring module 312 may be responsible for monitoring and evaluating information (e.g., IOPS)

indicative of a workload to which the storage node 300 is exposed. While various examples described herein may be described in the context of a total number of IOPS, it is to be appreciated the various approaches for automated tuning of QoS settings described herein are equally applicable to other individual characteristics of a workload or sets of one or more workload characteristics, including, but not limited to a number of read IOPS, a number of write IOPS, a proportion of read IOPS to write IOPS, an I/O size, and a statistical measure of any of the foregoing over a period of time.

The system metric monitoring module 313 may be responsible for monitoring and calculating a measure of load on the cluster as a whole and/or at various levels or layers of the cluster or the storage node 300. For example, metrics may be available for individual or groups of storage nodes (e.g., storage nodes 136a-n), individual or groups of volumes 321, individual or groups of slice services 320, and/or individual or groups of block services 315. In some embodiments, IO operations may be throttled by the storage OS 310 depending upon and responsive to one or more system metrics (e.g., SS load) exceeding various predefined or configurable thresholds. A graph illustrating an example of IOPS push back is described below with reference to FIG. 4.

While various examples described herein may be described with reference to the use of SS load as an example system load metric, it is to be appreciated the various approaches for automated tuning of QoS settings described herein are equally applicable various other individual system metrics and to sets of one or more system metrics, including, but not limited to a read latency metric, a write latency metric, an IOPS metric, a read IOPS metric, a write IOPS metric, a total bandwidth metric, a read bandwidth metric, a write bandwidth metric, a read/write IOPS ratio metric, a read/write latency metric, and a read/write bandwidth ratio metric.

Each slice service 220 may include one or more volumes (e.g., volumes 221a-x, volumes 221c-y, and volumes 221e-z). Client systems (not shown) associated with an enterprise may store data to one or more volumes, retrieve data from one or more volumes, and/or modify data stored on one or more volumes.

The slice services 220a-n and/or the client system may break data into data blocks. Block services 215a-q and slice services 220a-n may maintain mappings between an address of the client system and the eventual physical location of the data block in respective storage media of the storage node 200. In one embodiment, volumes 221 include unique and uniformly random identifiers to facilitate even distribution of a volume's data throughout a cluster (e.g., cluster 135). The slice services 220a-n may store metadata that maps between client systems and block services 215. For example, slice services 220 may map between the client addressing used by the client systems (e.g., file names, object names, block numbers, etc. such as Logical Block Addresses (LBAs)) and block layer addressing (e.g., block identifiers) used in block services 215. Further, block services 215 may map between the block layer addressing (e.g., block identifiers) and the physical location of the data block on one or more storage devices. The blocks may be organized within bins maintained by the block services 215 for storage on physical storage devices (e.g., SSDs).

A bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 215a-q and associated storage device (e.g., SSD). A sublist identifier may identify a sublist with the bin, which may be used to facilitate network transfer (or syncing) of data among block services in the event of a failure or crash of the storage node 200. Accordingly, a client can access data using a client address, which is eventually translated into the corresponding unique identifiers that reference the client's data at the storage node 200.

For each volume 221 hosted by a slice service 220, a list of block identifiers may be stored with one block identifier for each logical block on the volume. Each volume may be replicated between one or more slice services 220 and/or storage nodes 200, and the slice services for each volume may be synchronized between each of the slice services hosting that volume. Accordingly, failover protection may be provided in case a slice service 220 fails, such that access to each volume may continue during the failure condition.

The above structure allows storing of data evenly across the cluster of storage devices (e.g., SSDs), which allows for performance metrics to be used to manage load in the cluster. For example, if the cluster is under a load meeting or exceeding a particular threshold, clients can be throttled or locked out of a volume by, for example, the storage OS 210 reducing the amount of read or write data that is being processed by the storage node 200.

Input/Output Operations Per Second (IOPS) Push Back

Figure 4:
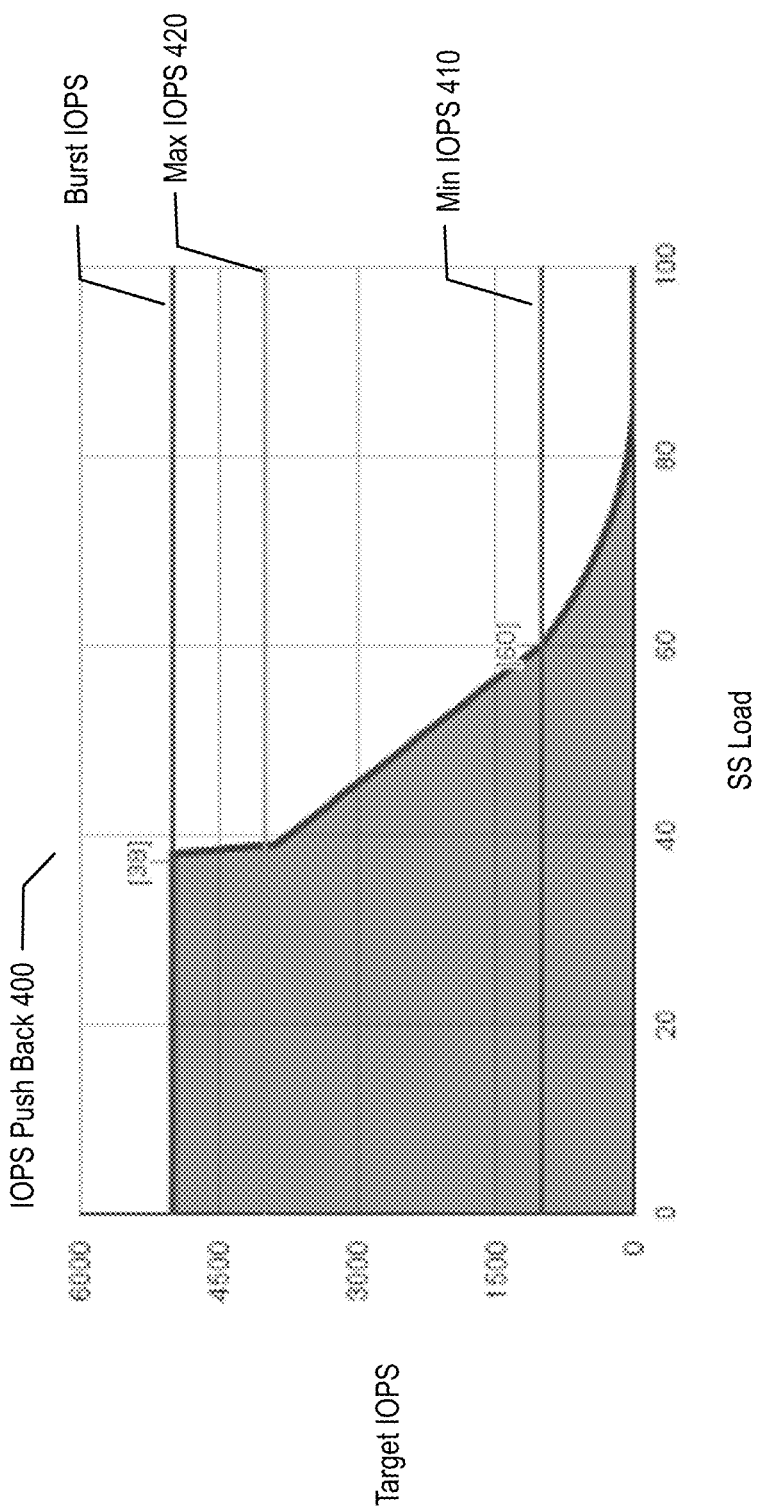
FIG. 4 is a graph illustrating input/output operations per second (IOPS) pushback in accordance with an embodiment of the present disclosure.

FIG. 4 is a graph illustrating input/output operations per second (IOPS) push back 400 in accordance with an embodiment of the present disclosure. In one embodiment, the IOPS pushback 400 is performed according to an SS Load calculation determined by a system metric monitoring module (e.g., system metric monitoring module 313) for a particular slice service (e.g., slice service 320a). As shown in the present example, when the SS Load value is within a first range (e.g., between 0 and 37, inclusive), the storage OS (e.g., storage OS 310) does not throttle the volumes residing on the particular slice service. When the SS Load value is within a second range (e.g., between 38-59, inclusive), the storage OS may throttle multiple volumes (e.g., all of volumes 312a-312x) residing on the particular slice service linearly from the maximum IOPS value 420 (e.g., 4,000 IOPS) to the minimum IOPS value 410 (e.g., 1,000 IOPS) based on the client QoS settings. If, instead, the SS Load value is within a third range (e.g., between 60-100, inclusive), the storage OS may throttle multiple volumes (e.g., all volumes 312a-312x) residing on the particular slice service using an inverse exponential function towards 0. Accordingly, if the user misconfigures the client QoS settings for the volumes, a slice service may be unnecessarily slow when responding to client requests. It should be understood that the above ranges are provided as examples and may vary in other examples.

Example DRL Agent

Figure 5:
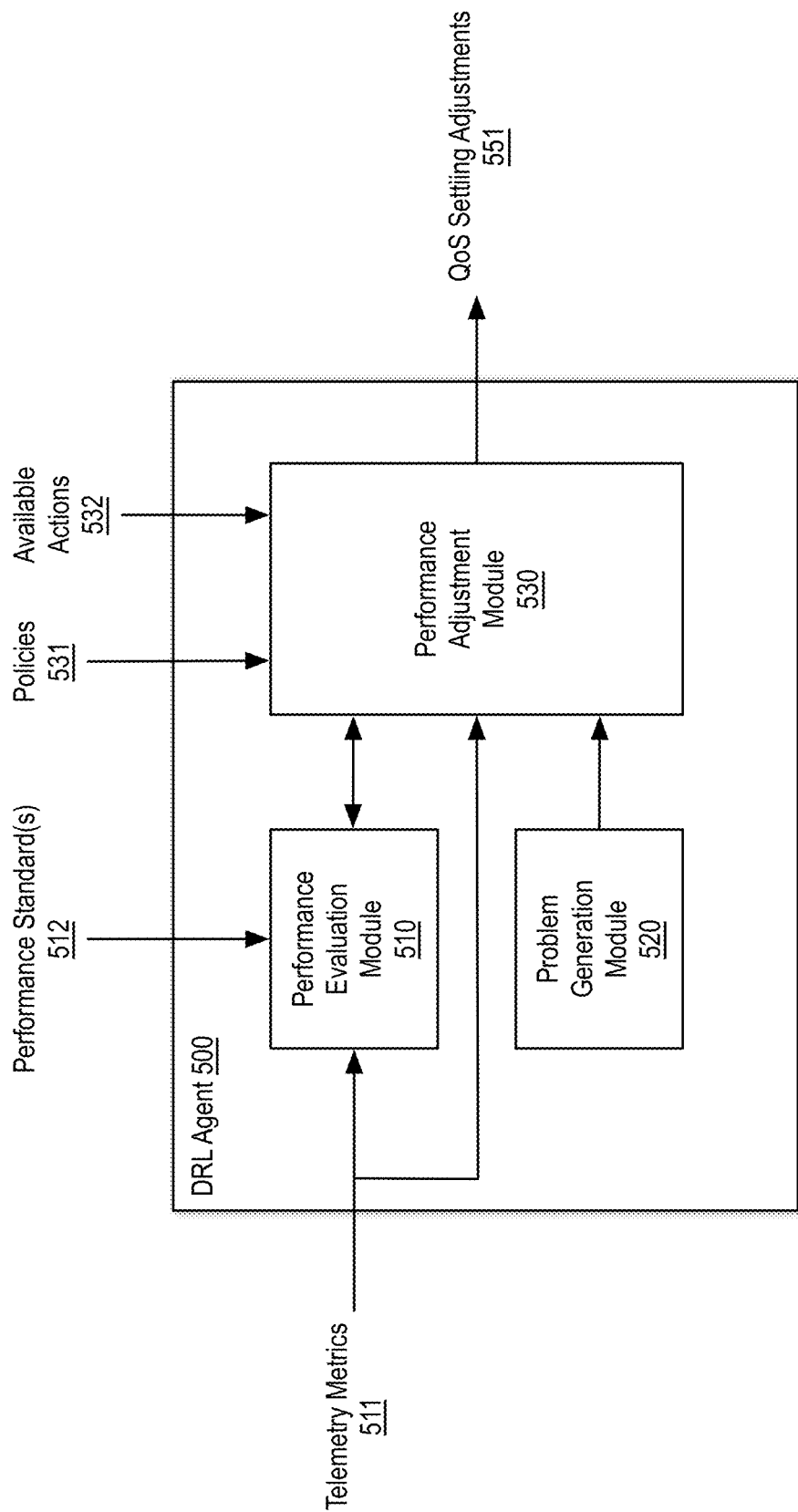
FIG. 5 is a block diagram illustrating functional units of a DRL agent in accordance with an embodiment of the present disclosure.

FIG. 5 is a block diagram illustrating functional units of a DRL agent 500 in accordance with an embodiment of the present disclosure. DRL agent 500 is a non-limiting example of DRL agents 124, 210, and 315. In the context of the present example, DRL agent 500 includes a performance evaluation module 510, a problem generation module 520, and a performance adjustment module 530. The DRL agent 500 may operate in two different modes of operation including a learning mode and an inference mode. During the learning mode, the DRL agent 500 may learn desirable behaviors based on trial-and-error experience resulting from being placed into various scenarios by the problem generation module 520. During the inference mode, the DRL agent 500 applies the learning acquired during the learning mode to select appropriate available actions 532 based on predefined policies 531.

In one embodiment, the performance evaluation module 510 is responsible for receiving telemetry metrics 511 from the environment (e.g., simulated environment 122 or environment 220, as the case may be), evaluating whether performance standard(s) 512 are satisfied, and conditionally invoking the performance adjustment module 530 when performance standard(s) 512 are not satisfied. The telemetry metrics may represent one or more of QoS settings, SS load, and/or system parameters/metrics collected by and/or calculated by the QoS module 311, the workload monitoring module 312, and/or the system metric monitoring module 313).

The performance standard(s) 512, policies 531, and available actions 532 may be provided by an administrative operator of the distributed storage system (e.g., cluster 135). The performance standard(s) may represent one or more relationships between and/or among various of the telemetry metrics 511 and/or with corresponding thresholds. In the context of the present example, a performance standard of all storage nodes (e.g., storage node 300) of the distributed storage system having an SS load of less than a load threshold (e.g., 35) is used for purposes of illustration. It is to be appreciated more, fewer, and/or different performance standards may be used depending upon the particular implementation. In one embodiment, the performance evaluation module 510 may be configured to minimize an SS load metric according to the performance standard(s) 512 through gradient descent methods within the finite, discreate domain of the system parameters.

Responsive to any of the performance standard(s) 512 not being satisfied, the performance evaluation module 510 may invoke the performance adjustment module 530 to take appropriate action. In one embodiment, the performance adjustment module 530 is responsible for evaluating policies 531 and the current state (e.g., state 222a) of the distributed storage system as represented by the telemetry metrics 511 to determine which, if any, of the available actions 532 should be taken. In some examples, the available actions 532 include adjusting one or more QoS settings (e.g., raising or lowering a minimum IOPS parameter (minIOPS), raising or lowering a maximum IOPS (maxIOPS) parameter, and/or raising or lowering a burst IOPS parameter (burstIOPS)). The performance evaluation module 510 may select among the available actions 532 based on the current state of the distributed storage system, its prior learning, and the predefined policies 531. In the context of the present example, the policies include the following (it is to be appreciated more, fewer, and/or different policies may be used):

If minIOPS<50, then minIOPS=50;
If $SUM\_(1, 2, \ldots i, 1, 2, \ldots k)$ minIOPS_(node_i, volume_k)>$SUM\_(1, 2, \ldots i)$^(node_i) maximum-rated IOPS_(node_i), then, then lower minIOPS below the maximum-rated IOPS for every node_i;
If $SUM\_(1, 2, \ldots i, 1, 2, \ldots k)$ maxIOPS_(node_i, volume_k)>$SUM\_(1, 2, \ldots i)$^(node_i), then lower maxIOPS below the maximum-rated IOPS for every node_i;
If minIOPS=maxIOPS, then raise maxIOPS by 100;
If maxIOPS=burstIOPS, then raise burstIOPS by 100;

Appropriately raise/lower minIOPS, maxIOPS, and/or burstIOPS to achieve a relatively even distribution of minimized SS load across all nodes.

According to one embodiment, during the learning mode, the problem generator module 520 is responsible for generating various scenarios and placing the performance adjustment module 530 into such scenarios to facilitate experiential learning by DRL agent 500. For example, the problem generator module 520 may run common workload scenarios, problem scenarios from the set of common workload scenarios, and/or various stress-testing scenarios. In some examples, the problem generator module 520 may use a brute force approach or perform a grid search to tune a number of learning iterations to be performed on the scenarios as described further below. During the learning mode, as a result of responding to the various scenarios generated by the problem generator module 520 learnings acquired by the performance adjustment module 530 may be shared with the perform evaluation module 510.

DRL Agent Training/Learning

Figure 6:
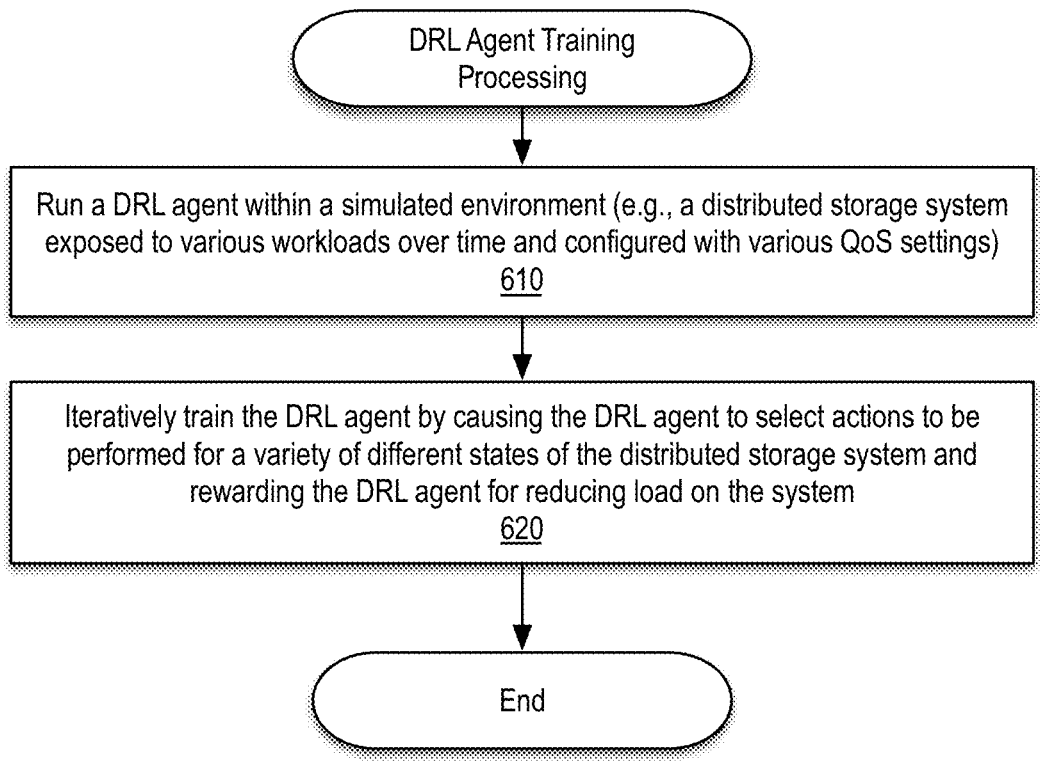
FIG. 6 is a flow diagram illustrating a set of operations for DRL agent training processing in accordance with an embodiment of the present disclosure.

FIG. 6 is a flow diagram illustrating a set of operations for DRL agent training processing in accordance with an embodiment of the present disclosure.

At block 610, a DRL agent is run within a simulated environment. In one embodiment, the simulated environment (e.g., simulated environment 122) includes one or more client systems directing IO operations to a distributed storage system configured similarly to one to which the trained DRL agent (e.g., DRL agent 315) will ultimately be deployed.

At block 620, the DRL agent is iteratively trained by causing the DRL agent to select actions to be performed for a variety of different states of a distributed storage system (e.g., a cluster including storage node 300). The DRL agent may be rewarded for selecting actions (e.g., updating the QoS settings or maintaining the current set of QoS settings of the distributed storage system) that reduce the load on the system based on an objective function. The objective function may minimize the sum of a load metric (e.g., SS load) for all nodes in distributed storage system.

In one embodiment the state of the distributed storage system is represented by a combination of a current set of one or more QoS settings, information indicative of a current workload, and current values of a set of one or more system metrics. The current set of one or more QoS settings may include a value for a minimum IOPS parameter, a value for a maximum IOPS parameter, and a value for a burst IOPS parameter. The workload may represent a metric relating to IO operations received by the distributed storage system and measured by a performance manager or system metric monitoring module (e.g., system metric monitoring module 313). The set of one or more system metrics may directly or indirectly represent a load on the distributed storage system. The DRL agent may be trained for workload characteristics expected to be experienced in a particular production environment or the DLR agent may be trained for a broad range of workload characteristics, which may be simulated by one of more clients directing IO operations to the distributed storage system, in which the IOPS and/or IO size of the IO operations may be varied over time to expose the DRL agent to a variety of workload characteristics.

In one embodiment a brute force approach may be used to attempt to place the DRL agent into every (feasible) state representing every (feasible) possible combination of QoS settings, workload conditions, and system metrics for a period of time for multiple iterations. For example, the distributed storage system may initially be configured in accordance with a number of different sets of QoS settings and exposed to workload characteristics in accordance with Table 1 (below) by programmatically causing one of more clients to direct IO operations to the distributed storage system.

TABLE 1

Brute Force Initial QoS settings and Workload Characteristics

| Initial Set of QoS Settings | Workload |
|---|---|
| Minimum QoS Parameter = $value_1$<br>Maximum QoS Parameter = $value_1$<br>Burst QoS Parameter = $value_1$ | IOPS = X |
| Minimum QoS Parameter = $value_1$<br>Maximum QoS Parameter = $value_1$<br>Burst QoS Parameter = $value_2$ | IOPS = X |
| Minimum QoS Parameter = $value_1$<br>Maximum QoS Parameter = $value_1$<br>Burst QoS Parameter = $value_3$ | IOPS = X |
| . . . | |
| Minimum QoS Parameter = $value_1$<br>Maximum QoS Parameter = $value_1$<br>Burst QoS Parameter = $value_n$ | IOPS = X |
| Minimum QoS Parameter = $value_1$<br>Maximum QoS Parameter = $value_2$<br>Burst QoS Parameter = $value_1$ | IOPS = X |
| Minimum QoS Parameter = $value_1$<br>Maximum QoS Parameter = $value_2$<br>Burst QoS Parameter = $value_2$ | IOPS = X |
| Minimum QoS Parameter = $value_1$<br>Maximum QoS Parameter = $value_2$<br>Burst QoS Parameter = $value_3$ | IOPS = X |
| . . . | |
| Minimum QoS Parameter = $value_1$<br>Maximum QoS Parameter = $value_2$<br>Burst QoS Parameter = $value_n$ | IOPS = X |
| Minimum QoS Parameter = $value_1$<br>Maximum QoS Parameter = $value_3$<br>Burst QoS Parameter = $value_1$ | IOPS = X |
| Minimum QoS Parameter = $value_1$<br>Maximum QoS Parameter = $value_3$<br>Burst QoS Parameter = $value_2$ | IOPS = X |
| Minimum QoS Parameter = $value_1$<br>Maximum QoS Parameter = $value_3$<br>Burst QoS Parameter = $value_3$ | IOPS = X |
| . . . | |
| Minimum QoS Parameter = $value_1$<br>Maximum QoS Parameter = $value_3$<br>Burst QoS Parameter = $value_n$ | IOPS = X |
| Minimum QoS Parameter = $value_1$<br>Maximum QoS Parameter = $value_n$<br>Burst QoS Parameter = $value_n$ | IOPS = X |
| Minimum QoS Parameter = $value_2$<br>Maximum QoS Parameter = $value_1$<br>Burst QoS Parameter = $value_1$ | IOPS = X |
| Minimum QoS Parameter = $value_2$<br>Maximum QoS Parameter = $value_1$<br>Burst QoS Parameter = $value_2$ | IOPS = X |
| Minimum QoS Parameter = $value_2$<br>Maximum QoS Parameter = $value_1$<br>Burst QoS Parameter = $value_3$ | IOPS = X |
| . . . | |
| Minimum QoS Parameter = $value_2$<br>Maximum QoS Parameter = $value_1$<br>Burst QoS Parameter = $value_n$ | IOPS = X |
| Minimum QoS Parameter = $value_3$<br>Maximum QoS Parameter = $value_1$<br>Burst QoS Parameter = $value_1$ | IOPS = X |
| Minimum QoS Parameter = $value_3$<br>Maximum QoS Parameter = $value_1$<br>Burst QoS Parameter = $value_2$ | IOPS = X |
| Minimum QoS Parameter = $value_3$<br>Maximum QoS Parameter = $value_1$<br>Burst QoS Parameter = $value_3$ | IOPS = X |
| . . . | |
| Minimum QoS Parameter = $value_3$<br>Maximum QoS Parameter = $value_1$<br>Burst QoS Parameter = $value_n$ | IOPS = X |

TABLE 1-continued

Brute Force Initial QoS settings and Workload Characteristics

| Initial Set of QoS Settings | Workload |
|---|---|
| Minimum QoS Parameter = $value_3$<br>Maximum QoS Parameter = $value_2$<br>Burst QoS Parameter = $value_1$ | IOPS = X |
| Minimum QoS Parameter = $value_3$<br>Maximum QoS Parameter = $value_2$<br>Burst QoS Parameter = $value_2$ | IOPS = X |
| Minimum QoS Parameter = $value_3$<br>Maximum QoS Parameter = $value_2$<br>Burst QoS Parameter = $value_3$ | IOPS = X |
| . . . | |
| Minimum QoS Parameter = $value_3$<br>Maximum QoS Parameter = $value_2$<br>Burst QoS Parameter = $value_n$ | IOPS = X |
| Minimum QoS Parameter = $value_3$<br>Maximum QoS Parameter = $value_3$<br>Burst QoS Parameter = $value_1$ | IOPS = X |
| Minimum QoS Parameter = $value_3$<br>Maximum QoS Parameter = $value_3$<br>Burst QoS Parameter = $value_2$ | IOPS = X |
| Minimum QoS Parameter = $value_3$<br>Maximum QoS Parameter = $value_3$<br>Burst QoS Parameter = $value_3$ | IOPS = X |
| . . . | |
| Minimum QoS Parameter = $value_3$<br>Maximum QoS Parameter = $value_3$<br>Burst QoS Parameter = $value_n$ | IOPS = X |
| Minimum QoS Parameter = $value_3$<br>Maximum QoS Parameter = $value_n$<br>Burst QoS Parameter = $value_n$ | IOPS = X |
| . . . | |
| Minimum QoS Parameter = $value_n$<br>Maximum QoS Parameter = $value_n$<br>Burst QoS Parameter = $value_n$ | IOPS = X |
| Minimum QoS Parameter = $value_1$<br>Maximum QoS Parameter = $value_1$<br>Burst QoS Parameter = $value_1$ | IOPS = Z |
| Minimum QoS Parameter = $value_1$<br>Maximum QoS Parameter = $value_1$<br>Burst QoS Parameter = $value_2$ | IOPS = Z |
| Minimum QoS Parameter = $value_1$<br>Maximum QoS Parameter = $value_1$<br>Burst QoS Parameter = $value_3$ | IOPS = Z |
| . . . | |
| Minimum QoS Parameter = $value_1$<br>Maximum QoS Parameter = $value_1$<br>Burst QoS Parameter = $value_n$ | IOPS = Z |
| Minimum QoS Parameter = $value_1$<br>Maximum QoS Parameter = $value_2$<br>Burst QoS Parameter = $value_1$ | IOPS = Z |
| Minimum QoS Parameter = $value_1$<br>Maximum QoS Parameter = $value_2$<br>Burst QoS Parameter = $value_2$ | IOPS = Z |
| Minimum QoS Parameter = $value_1$<br>Maximum QoS Parameter = $value_2$<br>Burst QoS Parameter = $value_3$ | IOPS = Z |
| . . . | |
| Minimum QoS Parameter = $value_1$<br>Maximum QoS Parameter = $value_2$<br>Burst QoS Parameter = $value_n$ | IOPS = Z |
| Minimum QoS Parameter = $value_1$<br>Maximum QoS Parameter = $value_3$<br>Burst QoS Parameter = $value_1$ | IOPS = Z |
| Minimum QoS Parameter = $value_1$<br>Maximum QoS Parameter = $value_3$<br>Burst QoS Parameter = $value_2$ | IOPS = Z |
| Minimum QoS Parameter = $value_1$<br>Maximum QoS Parameter = $value_3$<br>Burst QoS Parameter = $value_3$ | IOPS = Z |
| . . . | |
| Minimum QoS Parameter = $value_1$<br>Maximum QoS Parameter = $value_3$<br>Burst QoS Parameter = $value_n$ | IOPS = Z |
| . . . | |
| Minimum QoS Parameter = $value_1$<br>Maximum QoS Parameter = $value_n$ | IOPS = Z |

TABLE 1-continued

Brute Force Initial QoS settings and Workload Characteristics

| Initial Set of QoS Settings | Workload |
|---|---|
| Burst QoS Parameter = $value_n$<br>Minimum QoS Parameter = $value_2$<br>Maximum QoS Parameter = $value_1$<br>Burst QoS Parameter = $value_1$ | IOPS = Z |
| Minimum QoS Parameter = $value_2$<br>Maximum QoS Parameter = $value_1$<br>Burst QoS Parameter = $value_2$ | IOPS = Z |
| Minimum QoS Parameter = $value_2$<br>Maximum QoS Parameter = $value_1$<br>Burst QoS Parameter = $value_3$ | IOPS = Z |
| . . . | |
| Minimum QoS Parameter = $value_2$<br>Maximum QoS Parameter = $value_1$<br>Burst QoS Parameter = $value_n$ | IOPS = Z |
| Minimum QoS Parameter = $value_3$<br>Maximum QoS Parameter = $value_1$<br>Burst QoS Parameter = $value_1$ | IOPS = Z |
| Minimum QoS Parameter = $value_3$<br>Maximum QoS Parameter = $value_1$<br>Burst QoS Parameter = $value_2$ | IOPS = Z |
| Minimum QoS Parameter = $value_3$<br>Maximum QoS Parameter = $value_1$<br>Burst QOS Parameter = $value_3$ | IOPS = Z |
| . . . | |
| Minimum QoS Parameter = $value_3$<br>Maximum QoS Parameter = $value_1$<br>Burst QoS Parameter = $value_n$ | IOPS = Z |
| Minimum QoS Parameter = $value_3$<br>Maximum QoS Parameter = $value_2$<br>Burst QoS Parameter = $value_1$ | IOPS = Z |
| Minimum QoS Parameter = $value_3$<br>Maximum QoS Parameter = $value_2$<br>Burst QoS Parameter = $value_2$ | IOPS = Z |
| Minimum QoS Parameter = $value_3$<br>Maximum QoS Parameter = $value_2$<br>Burst QoS Parameter = $value_3$ | IOPS = Z |
| . . . | |
| Minimum QoS Parameter = $value_3$<br>Maximum QoS Parameter = $value_2$<br>Burst QoS Parameter = $value_n$ | IOPS = Z |
| Minimum QoS Parameter = $value_3$<br>Maximum QoS Parameter = $value_3$<br>Burst QoS Parameter = $value_1$ | IOPS = Z |
| Minimum QoS Parameter = $value_3$<br>Maximum QoS Parameter = $value_3$<br>Burst QoS Parameter = $value_2$ | IOPS = Z |
| Minimum QoS Parameter = $value_3$<br>Maximum QoS Parameter = $value_3$<br>Burst QoS Parameter = $value_3$ | IOPS = Z |
| . . . | |
| Minimum QoS Parameter = $value_3$<br>Maximum QoS Parameter = $value_3$<br>Burst QoS Parameter = $value_n$ | IOPS = Z |
| . . . | |
| Minimum QoS Parameter = $value_3$<br>Maximum QoS Parameter = $value_n$<br>Burst QoS Parameter = $value_n$ | IOPS = Z |
| . . . | |
| Minimum QoS Parameter = $value_n$<br>Maximum QoS Parameter = $value_n$<br>Burst QoS Parameter = $value_n$ | IOPS = Z |
| . . . | |
| Minimum QoS Parameter = $value_1$<br>Maximum QoS Parameter = $value_1$<br>Burst QoS Parameter = $value_1$ | IOPS = Z |
| Minimum QoS Parameter = $value_1$<br>Maximum QoS Parameter = $value_1$<br>Burst QoS Parameter = $value_2$ | IOPS = Z |
| Minimum QoS Parameter = $value_1$<br>Maximum QoS Parameter = $value_1$<br>Burst QoS Parameter = $value_3$ | IOPS = Z |
| . . . | |
| Minimum QoS Parameter = $value_1$<br>Maximum QoS Parameter = $value_1$<br>Burst QoS Parameter = $value_n$ | IOPS = Z |
| Minimum QoS Parameter = $value_1$ | IOPS = Z |

TABLE 1-continued

Brute Force Initial QoS settings and Workload Characteristics

| Initial Set of QoS Settings | Workload |
|---|---|
| Maximum QoS Parameter = $value_2$<br>Burst QoS Parameter = $value_1$ | |
| Minimum QoS Parameter = $value_1$<br>Maximum QoS Parameter = $value_2$<br>Burst QoS Parameter = $value_2$ | IOPS = Z |
| Minimum QoS Parameter = $value_1$<br>Maximum QoS Parameter = $value_2$<br>Burst QoS Parameter = $value_3$ | IOPS = Z |
| . . . | |
| Minimum QoS Parameter = $value_1$<br>Maximum QoS Parameter = $value_2$<br>Burst QoS Parameter = $value_n$ | IOPS = Z |
| Minimum QoS Parameter = $value_1$<br>Maximum QoS Parameter = $value_3$<br>Burst QoS Parameter = $value_1$ | IOPS = Z |
| Minimum QoS Parameter = $value_1$<br>Maximum QoS Parameter = $value_3$<br>Burst QoS Parameter = $value_2$ | IOPS = Z |
| Minimum QoS Parameter = $value_1$<br>Maximum QoS Parameter = $value_3$<br>Burst QoS Parameter = $value_3$ | IOPS = Z |
| . . . | |
| Minimum QoS Parameter = $value_1$<br>Maximum QoS Parameter = $value_3$<br>Burst QoS Parameter = $value_n$ | IOPS = Z |
| . . . | |
| Minimum QoS Parameter = $value_1$<br>Maximum QoS Parameter = $value_n$<br>Burst QoS Parameter = $value_n$ | IOPS = Z |
| Minimum QoS Parameter = $value_2$<br>Maximum QoS Parameter = $value_1$<br>Burst QoS Parameter = $value_1$ | IOPS = Z |
| Minimum QoS Parameter = $value_2$<br>Maximum QoS Parameter = $value_1$<br>Burst QoS Parameter = $value_2$ | IOPS = Z |
| Minimum QoS Parameter = $value_2$<br>Maximum QoS Parameter = $value_1$<br>Burst QOS Parameter = $value_3$ | IOPS = Z |
| . . . | |
| Minimum QoS Parameter = $value_2$<br>Maximum QoS Parameter = $value_1$<br>Burst QoS Parameter = $value_n$ | IOPS = Z |
| Minimum QoS Parameter = $value_3$<br>Maximum QoS Parameter = $value_1$<br>Burst QoS Parameter = $value_1$ | IOPS = Z |
| Minimum QoS Parameter = $value_3$<br>Maximum QoS Parameter = $value_1$<br>Burst QoS Parameter = $value_2$ | IOPS = Z |
| Minimum QoS Parameter = $value_3$<br>Maximum QoS Parameter = $value_1$<br>Burst QoS Parameter = $value_3$ | IOPS = Z |
| . . . | |
| Minimum QoS Parameter = $value_3$<br>Maximum QoS Parameter = $value_1$<br>Burst QoS Parameter = $value_n$ | IOPS = Z |
| Minimum QoS Parameter = $value_3$<br>Maximum QoS Parameter = $value_2$<br>Burst QoS Parameter = $value_1$ | IOPS = Z |
| Minimum QoS Parameter = $value_3$<br>Maximum QoS Parameter = $value_2$<br>Burst QoS Parameter = $value_2$ | IOPS = Z |
| Minimum QoS Parameter = $value_3$<br>Maximum QoS Parameter = $value_2$<br>Burst QoS Parameter = $value_3$ | IOPS = Z |
| . . . | |
| Minimum QoS Parameter = $value_3$<br>Maximum QoS Parameter = $value_2$<br>Burst QoS Parameter = $value_n$ | IOPS = Z |
| Minimum QoS Parameter = $value_3$<br>Maximum QoS Parameter = $value_3$<br>Burst QoS Parameter = $value_1$ | IOPS = Z |
| Minimum QoS Parameter = $value_3$<br>Maximum QoS Parameter = $value_3$<br>Burst QoS Parameter = $value_2$ | IOPS = Z |
| Minimum QoS Parameter = $value_3$<br>Maximum QoS Parameter = $value_3$ | IOPS = Z |

TABLE 1-continued

Brute Force Initial QoS settings and Workload Characteristics

| Initial Set of QoS Settings | Workload |
|---|---|
| Burst QoS Parameter = $value_3$ <br> . . . <br> Minimum QoS Parameter = $value_3$ <br> Maximum QoS Parameter = $value_3$ <br> Burst QoS Parameter = $value_n$ | IOPS = Z |
| . . . <br> Minimum QoS Parameter = $value_3$ <br> Maximum QoS Parameter = $value_n$ <br> Burst QoS Parameter = $value_n$ | IOPS = Z |
| . . . <br> Minimum QoS Parameter = $value_n$ <br> Maximum QoS Parameter = $value_n$ <br> Burst QoS Parameter = $value_n$ | IOPS = Z |

Those skilled in the art will appreciate additional columns may be added to Table 1 for other workload characteristics (e.g., I/O size, proportions of read IOPS to write IOPS, etc.). For example, for each of the scenarios represented in Table 1, the training may again be repeated for I/O sizes of 4 KB, 8 KB, 16 KB, and 32 KB and/or for varying proportions of read IOPS to write IOPS. In alternative embodiments, the training may involve exposing the DRL agent to only those workload characteristics expected to be experienced within a particular production environment. For example, the DRL agent may be specifically trained for a transactional environment, a compute heavy environment, or other type of environment specified by a customer. For purposes of efficiency, combinations of initial QoS settings representing situations not expected to occur or which are invalid (e.g., minimum QoS parameter value>maximum QoS parameter value and burst QoS parameter<maximum QoS parameter value) may be excluded from the training iterations. Alternatively, the DRL agent may be trained for states of a cluster that might operate within a production environment exhibiting a range of workload characteristics in terms of IOPS (e.g., frequent and infrequent IOPS, periods of time having frequent and infrequent read IOPS, periods of time having frequent and infrequent write IOPS, periods of time having high and low proportions of read IOPS to write IOPS, periods of time having small, medium, and large I/O size, etc.).

In one embodiment, a grid search like approach may be used by the simulated environment to tune the number of iterations performed during the learning mode. For example, the DRL agent may continue to iterate through the scenarios until the search converges on parameter values that minimize the SS load values across the nodes. More specifically, the DRL agent may continue to learn until the error is no longer significantly decreasing, which implies convergence.

For purposes of illustration, a sample grid search is described with reference to a non-limiting concrete example in which the distributed storage system includes four nodes and each node has a maximum IOPS rating of 250,000 IOPS for a total of 1 million IOPS for the entire system. In this example, the three QoS parameters that are available for tuning include minIOPS, maxIOPS, and burstIOPS and for a given volume, the following rules exist for these settings:

50<=minIOPS<=maxIOPS−50
maxIOPS !=minIOPS
maxIOPS !=burstIOPS
The sum of all maxIOPS settings for all volumes on a node<=the maximum rated IOPS for that node (in this example, 250,000)

Using the above rules, the search space for each setting may be drastically reduced, thereby increasing the likelihood of convergence in fewer iterations. For example, for a volume:

minIOPS=X, which implies X∈[50, Y−50]
maxIOPS=Y, which implies Y∈[X=50, 250,000]
burstIOPS=Z, which implies Z∈[Y, 250,000]

The search space in this context is finite and discrete, but can still be limited further by "chunking" the possible IOPS values available for search by a constant factor (e.g., 10 and 100 for minIOPS and maxIOPS/burstIOPS, respectively). For example, the minIOPS parameter may be selected from a search space (S) that is defined by S module 10=0 and the maxIOPS/burstIOPS parameters may be selected from a search space (S_1) defined by: S_1 modulo 100=0. In this case, with the addition of "chunking," the above minIOPS<=maxIOPS−50 rule becomes minIOPS<=maxIOPS−100.

In accordance with the above rules a sample grid for the search would be as presented in Table 2.

TABLE 2

Sample Grid for Search

| minIOPS | maxIOPS | burstIOPS |
|---|---|---|
| 50 | 1000 | 1100 |
| 60 | 1100 | 1200 |
| . . . | . . . | . . . |
| 950 | 1000 | 1500 |
| . . . | . . . | . . . |
| 100 | 25200 | 27500 |
| . . . | . . . | . . . |
| 10020 | 10120 | 34750 |
| . . . | . . . | . . . |

Continuing with this example, the parameter grid for the search space for each parameter may be constructed as follows:

50<=minIOPS<=maxIOPS−50
maxIOPS !=minIOPS
maxIOPS !=burstIOPS
The sum of all maxIOPS settings for all volumes on a node<=maximum rated IOPS for that node (in this example it is 250,000)
The search space for minIOPS: S modulo 10=0
The search space for maxIOPS/burstIOPS: S_1 modulo 100=0.

To the extent it is desirable to control the number of learning iterations, as an alternative to the above-described grid search, a random grid search approach may be used. Random gird searches typically converge within approximately sixty iterations.

Automated Tuning of QoS Settings

Figure 7:
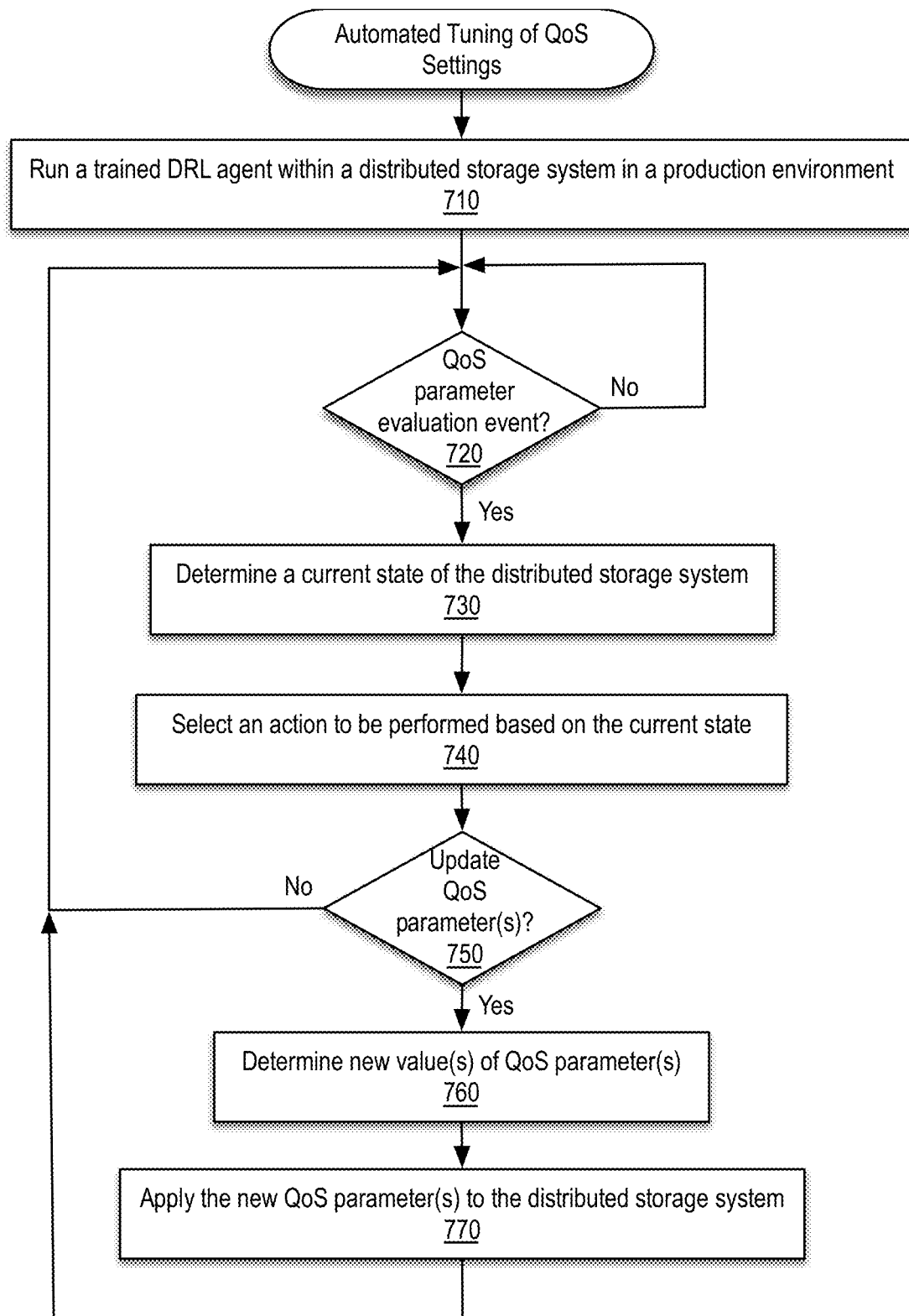
FIG. 7 is a flow diagram illustrating a set of operations for automated tuning of QoS settings in accordance with an embodiment of the present disclosure.

FIG. 7 is a flow diagram illustrating a set of operations for automated tuning of QoS settings in accordance with an embodiment of the present disclosure. In the context of the present example, a DRL agent (e.g., DRL agent 315) trained, for example, as described above with reference to FIG. 6, may be deployed within a distributed storage system (e.g., cluster 135) in a production environment (e.g., data center 130a) and configured to continually update QoS settings for the distributed storage system to minimize one or more representations of the load on the distributed storage system. As discussed above, one or more system metrics may directly or indirectly represent the load on the distributed storage system.

At block 710, the trained DRL agent may be run within the distributed storage system in the production environment.

At decision block 720, it is determined whether a QoS parameter evaluation event has occurred. If so, then processing continues with block 730; otherwise, processing loops back to decision block 720. Depending upon the particular implementation, the QoS parameter evaluation event may be time based or based on the system metrics. For example, a QoS parameter evaluation event may be triggered every X hours (e.g., 24 hours) or responsive to the SS load exceeding a predetermined or configurable threshold (representing a triggering event).

At block 730, a current state of the distributed storage system is determined. As noted above, the current state of a distributed storage system may be represented by a combination of the current set of QoS setting being enforced by the distributed storage system, the information indicative of the current workload characteristics, and a current set of system metrics or values derived therefrom (e.g., an SS load metric, a read latency metric, a write latency metric, an IOPS metric, a read IOPS metric, a write IOPS metric, a total bandwidth metric, a read bandwidth metric, a write bandwidth metric, a read/write IOPS ratio metric, a read/write latency metric, or a read/write bandwidth ratio metric). For example, the current set of QoS settings (e.g., minimum IOPS, maximum IOPS, and burst IOPS for one or more particular volumes for one or more particular clients) may be obtained from a QoS system (e.g., QoS module 311), the information regarding workload characteristics may be obtained from a workload monitoring module (e.g., workload monitoring module 312), and the current set of system metrics may be obtained from a performance manager or a system metric monitoring module (e.g., system metric monitoring module 313).

The current state of the distributed storage system may be determined based on the most recent sample period for the workload characteristics, the set of system metrics, or values derived therefrom. Alternatively, if hysteresis is desired, the current state of the distributed storage system may be based in part (e.g., 30%) on accumulated past data from prior sample periods (e.g., the previous 2 to 4 weeks) and based in part (e.g., 70%) on data gathered from the current sample period. In this manner, the metrics may leverage average real-time data on a continuous scale rather than on an interval scale.

At block 740, the DRL agent selects an action to be performed based on the current state. In one embodiment, the available actions include updating the current set of QoS settings or maintaining the current set of QoS settings.

At decision block 750, it is determined whether the selected action involves updating the QoS parameters. If so, then processing continues with block 760; otherwise, processing loops back to decision block 720.

At block 760, new values of the QoS parameters are determined. Depending upon the particular implementation, a variety of different approaches may be taken. According to one embodiment, one or more values of the QoS parameters may be increased or decreased by a constant factor or a dynamic factor. For example, the minimum IOPS value adjusted by fifty percent, the maximum IOPS value may be adjusted by thirty percent, and the burst IOPS value may be adjusted by twenty percent subject to limits defined in the domain of the system. Such limits may specify upper and lower thresholds for the QoS parameters and/or relationship among the QoS parameters. For example, the limits may indicate the minimum IOPS should not drop below 50 and should be less than or equal to maximum IOPS−100 and the sum of the maximum IOPS across the nodes should not exceed the maximum IOPS rating (e.g., 250,000) for the nodes.

Alternatively, a search (e.g., a brute force search, a binary search, or a grid search) may be performed by the DRL agent for a particular combination of values of the QoS parameters expected to minimize the load (e.g., SS Load) on the distributed storage system based on its prior learning within the simulated environment.

Further still, the domain of the QoS parameter values may be constrained based on empirical evidence derived from the simulated environment. For instance, a MySQL workload running a write intensive and busty workload on a monthly cadence might allow for lower minimum IOPS setting (since such a workload will be idle most of the time), have a mid-to-low-range maximum IOPS setting, and a large allowable burst IOPS setting.

At block 770, the new QoS parameter values determined in block 760 are applied to the distributed storage system. For example, the DRL agent may direct the QoS system to apply the new QoS parameters to a particular volume of the distributed storage system for a particular client.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Example Computer System

Figure 8:
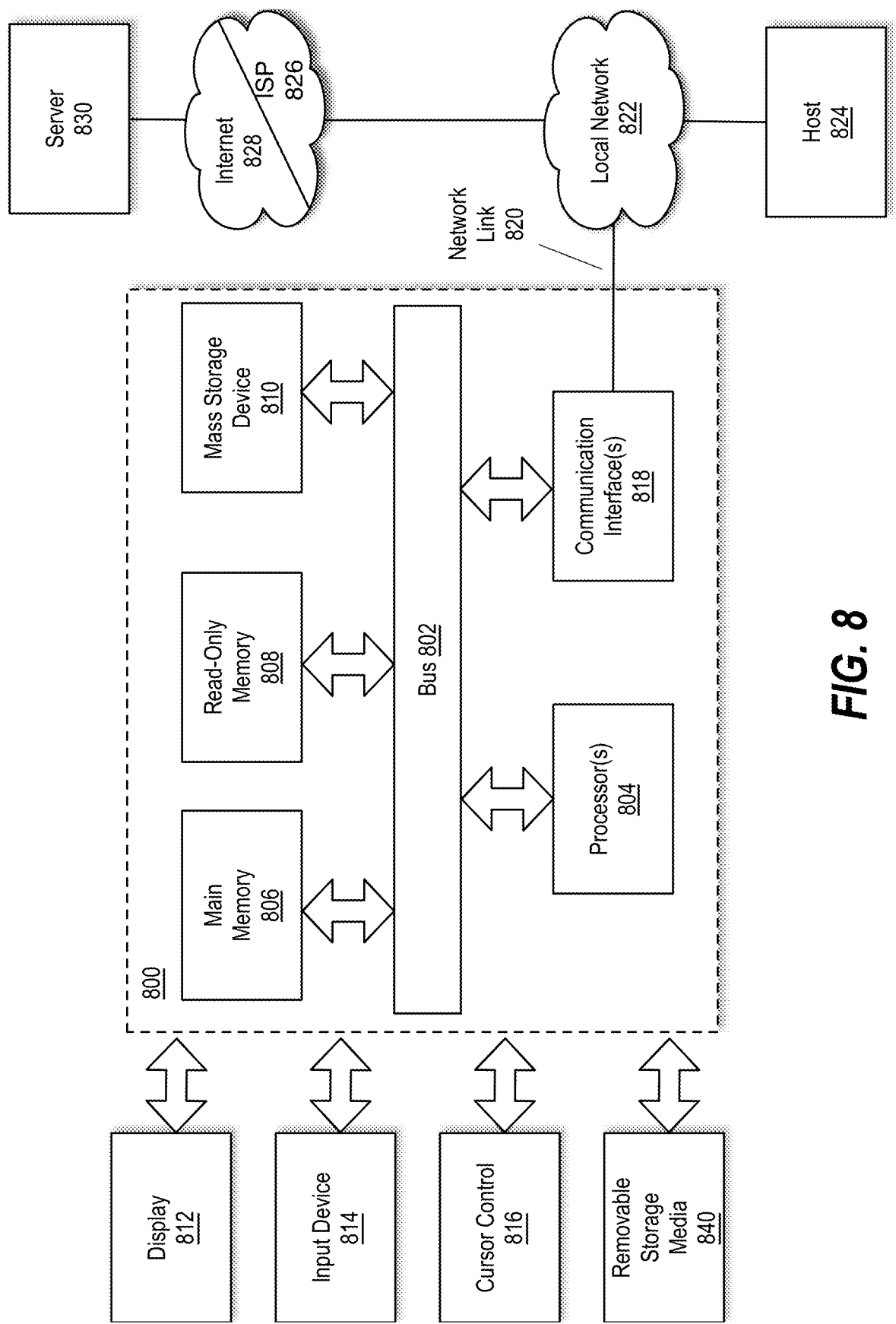
FIG. 8 illustrates an example computer system in which or with which embodiments of the present disclosure may be utilized.

FIG. 8 is a block diagram that illustrates a computer system 800 in which or with which an embodiment of the present disclosure may be implemented. Computer system 800 may be representative of all or a portion of the computing resources associated with a storage node (e.g., storage node 136), a collector (e.g., collector 138), a monitoring system (e.g., monitoring system 122) or an administrative workstation (e.g., computer system 110). Notably, components of computer system 800 described herein are meant only to exemplify various possibilities. In no way should example computer system 800 limit the scope of the present disclosure. In the context of the present example, computer system 800 includes a bus 802 or other communication mechanism for communicating information, and a processing resource (e.g., a hardware processor 804) coupled with bus 802 for processing information. Hardware processor 804 may be, for example, a general-purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, e.g., a magnetic disk, optical disk or flash disk (made of flash memory chips), is provided and coupled to bus 802 for storing information and instructions.

Computer system 800 may be coupled via bus 802 to a display 812, e.g., a cathode ray tube (CRT), Liquid Crystal Display (LCD), Organic Light-Emitting Diode Display (OLED), Digital Light Processing Display (DLP) or the like, for displaying information to a computer user. An input device 814, including alphanumeric and other keys, is coupled to bus 802 for communicating information and command selections to processor 804. Another type of user input device is cursor control 816, such as a mouse, a trackball, a trackpad, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Removable storage media 840 can be any kind of external storage media, including, but not limited to, hard-drives, floppy drives, IOMEGA® Zip Drives, Compact Disc
  Read Only Memory (CD-ROM), Compact Disc-Re-Writable (CD-RW), Digital Video Disk
  Read Only Memory (DVD-ROM), USB flash drives and the like.

Computer system 800 may implement the techniques described herein using customized hard-wired logic, one or more ASICs or FPGAs, firmware or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 810. Volatile media includes dynamic memory, such as main memory 806. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, or stored in storage device 810, or other non-volatile storage for later execution.

What is claimed is:

1. A distributed storage system (DSS) comprising:
one or more processors; and
instructions that when executed by the one or more processors cause a deep reinforcement learning (DRL) agent of the DSS to:
determine, based on a current state of the DSS, whether to update a Quality of Service (QoS) setting of the DSS representing a level of performance being provided by the DSS to a client, wherein the current state includes (i) the QoS setting, (ii) information indicative of a type of workload to which the DSS is exposed, and (iii) a system metric indicative of a load on the DSS; and
after an affirmative determination:
determine an updated QoS setting; and
apply the updated QoS setting.

2. The DSS of claim 1, wherein determining whether to update the QoS setting involves selecting an action to be performed from among a plurality of predefined actions based on the current state and previous learning by the DRL agent regarding minimizing the system metric for one or more types of workloads based on various QoS settings.

3. The DSS of claim 2, wherein the plurality of predefined actions comprise one or more of increasing or decreasing a minimum Input/Output (I/O) operations Per Second (IOPS) parameter, increasing or decreasing a maximum IOPS parameter, and increasing or decreasing a burst IOPS parameter for a volume of the DSS.

4. The DSS of claim 1, wherein the information indicative of the type of workload is determined by monitoring Input/Output Operations (IOPs) received by the DSS over a period of time.

5. The DSS of claim 1, wherein the information indicative of the type of workload comprises a total number of IOPS, a number of read IOPS, a number of write IOPS, a proportion of read IOPS to write IOPS, an I/O size, or a statistical measure of any of the foregoing over a period of time.

6. The DSS of claim 1, wherein the QoS setting comprises a minimum for a QoS parameter, a maximum for the QoS parameter, or a maximum burst value for the QoS parameter.

7. The DSS of claim 6, wherein the QoS parameter comprises a read latency parameter, a write latency parameter, a total IOPS parameter, a read IOPS parameter, a write IOPS parameter, an I/O size parameter, a total bandwidth parameter, a read bandwidth parameter, a write bandwidth parameter, or a read/write IOPS ratio parameter.

8. The DSS of claim 1, wherein the system metric comprises a slice service load (SS Load) metric, a read latency metric, a write latency metric, an IOPS metric, a read IOPS metric, a write IOPS metric, a total bandwidth metric, a read bandwidth metric, a write bandwidth metric, a read/write IOPS ratio metric, a read/write latency metric, or a read/write bandwidth ratio metric.

9. The DSS of claim 1, wherein the updated QoS setting is determined by searching among a plurality of potential values of the QoS setting for a particular value that is expected to lessen the value of the system metric.

10. A non-transitory computer-readable storage medium embodying a set of instructions, which when executed by one or more processors of a distributed storage system (DSS), cause a deep reinforcement learning (DRL) agent of the DSS to:
determine, based on a current state of the DSS, whether to update a Quality of Service (QoS) setting of the DSS representing a level of performance being provided by the DSS to a client, wherein the current state includes (i) the QoS setting, (ii) information indicative of a type of workload to which the DSS is exposed, and (iii) a system metric indicative of a load on the DSS; and
after an affirmative determination:
determine an updated QoS setting; and
apply the updated QoS setting.

11. The non-transitory computer-readable storage medium of claim 10, wherein the information indicative of the type of workload is determined by monitoring Input/Output Operations (IOPs) received by the DSS over a period of time.

12. The non-transitory computer-readable storage medium of claim 10, wherein the updated QoS setting is determined by searching among a plurality of values of the QoS setting for a particular value that is expected to lessen the value of the system metric.

13. The non-transitory computer-readable storage medium of claim 10, wherein the information indicative of the type of workload comprises a total number of Input/Output (I/O) operations Per Second (IOPS), a number of read IOPS, a number of write IOPS, a proportion of read IOPS to write IOPS, an I/O size, or a statistical measure of any of the foregoing over a period of time, wherein the QoS setting comprises a minimum for a QoS parameter, a maximum for the QoS parameter, or a maximum burst value for the QoS parameter, wherein the QoS parameter comprises a read latency parameter, a write latency parameter, a total IOPS parameter, a read IOPS parameter, a write IOPS parameter, an I/O size parameter, a total bandwidth parameter, a read bandwidth parameter, a write bandwidth parameter, or a read/write IOPS ratio parameter, and wherein the system metric comprises a slice service load (SS Load) metric, a read latency metric, a write latency metric, an IOPS metric, a read IOPS metric, a write IOPS metric, a total bandwidth metric, a read bandwidth metric, a write bandwidth metric, a read/write IOPS ratio metric, a read/write latency metric, or a read/write bandwidth ratio metric.

14. A method comprising:
training a deep reinforcement learning (DRL) agent of a distributed storage system (DSS) by, for each state of a plurality of states of the DSS:
causing the DRL agent to determine whether to update a set of Quality of Service (QoS) parameters representing a level of performance being provided by the DSS to a client, during a current iteration of the training based on the state, wherein the state includes (i) the set of QoS parameters, (ii) information indicative of a type of workload to which the DSS is exposed, and (iii) a system metric indicative of a load on the DSS;
after an affirmative determination by the DRL agent:

identifying, by the DRL agent, an updated set of QoS parameters;

applying the updated set of QoS parameters;

evaluating the system metric after application of the updated set of QoS parameters; and conditionally rewarding the DRL agent based on the application of the updated set of QoS parameters resulting in a lessening of the system metric.

15. The method of claim 14, further comprising facilitating automatic tuning of the set of QoS parameters within a second DSS by deploying the DRL agent within the second DSS.

16. The method of claim 14, wherein the information indicative of the workload is determined by monitoring Input/Output Operations (IOPs) received by the DSS over a period of time.

17. The method of claim 14, wherein the information indicative of the type of workload comprises a total number of Input/Output (I/O) operations Per Second (IOPS), a number of read IOPS, a number of write IOPS, a proportion of read IOPS to write IOPS, an I/O size, or a statistical measure of any of the foregoing over a period of time.

18. The method of claim 14, wherein the set of QoS parameters includes one or more of a minimum for a QoS parameter, a maximum for the QoS parameter, and a maximum burst value for the QoS parameter.

19. The method of claim 18, wherein the QoS parameter comprises a read latency parameter, a write latency parameter, a total IOPS parameter, a read IOPS parameter, a write IOPS parameter, an I/O size parameter, a total bandwidth parameter, a read bandwidth parameter, a write bandwidth parameter, or a read/write IOPS ratio parameter.

20. The method of claim 14, wherein the system metric comprises a slice service load (SS Load) metric, a read latency metric, a write latency metric, an IOPS metric, a read IOPS metric, a write IOPS metric, a total bandwidth metric, a read bandwidth metric, a write bandwidth metric, a read/write IOPS ratio metric, a read/write latency metric, or a read/write bandwidth ratio metric.

* * * * *